(12) United States Patent
Wang et al.

(10) Patent No.: US 11,614,953 B2
(45) Date of Patent: Mar. 28, 2023

(54) METHOD AND APPARATUS FOR IMPLEMENTING OSD

(71) Applicant: BEIJING XIAOMI MOBILE SOFTWARE CO., LTD., Beijing (CN)

(72) Inventors: Qiang Wang, Beijing (CN); Xiaobo Peng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 164 days.

(21) Appl. No.: 16/849,519

(22) Filed: Apr. 15, 2020

(65) Prior Publication Data

US 2021/0141653 A1    May 13, 2021

(30) Foreign Application Priority Data

Nov. 8, 2019  (CN) .......................... 201911089144.8

(51) Int. Cl.
*G06F 3/0484*    (2022.01)
*G06F 9/451*    (2018.01)
(Continued)

(52) U.S. Cl.
CPC ............ *G06F 9/451* (2018.02); *G06F 3/0487* (2013.01); *G06F 3/04842* (2013.01); *G06F 9/542* (2013.01)

(58) Field of Classification Search
CPC ...... G06F 9/451; G06F 3/04842; G06F 9/542; G06F 3/0487
See application file for complete search history.

(56) References Cited

U.S. PATENT DOCUMENTS

| 6,598,169 B1 * | 7/2003 | Warwick .................. G06F 1/28 |
| | | 719/321 |
| 10,481,753 B2 | 11/2019 | Lee et al. |

(Continued)

FOREIGN PATENT DOCUMENTS

| CN | 101312511 A | 11/2008 |
| CN | 108886634 A | 11/2018 |
| WO | WO 2008/097273 A1 | 8/2008 |

OTHER PUBLICATIONS

Extended European Search Report dated Jul. 8, 2020 in European Patent Application No. 20171568.7, 7 pages.

(Continued)

*Primary Examiner* — Phenuel S Salomon
(74) *Attorney, Agent, or Firm* — Oblon, McClelland, Maier & Neustadt, L.L.P.

(57) ABSTRACT

The present disclosure provides a method and apparatus for implementing OSD, and relates to the OSD technology. The method for implementing OSD provided by the present disclosure can include receiving a WMI event, the WMI event being triggered based on an OSD shortcut operation initiated by a user, and determining an OSD function corresponding to the WMI event according to a correspondence between WMI events and OSD functions, and acquiring popup window information corresponding to the OSD function. The method can further include generating an OSD function popup window according to the popup window information, and displaying the OSD function popup window. In embodiments of the present disclosure, attention is paid to WMI events corresponding to OSD shortcut operations, and corresponding OSD functions triggered by the WMI events. Thus, a unified implementation method for OSD functions of terminal devices produced by different manufacturers can be provided.

15 Claims, 4 Drawing Sheets

(51) Int. Cl.
*G06F 3/04842* (2022.01)
*G06F 3/0487* (2013.01)
*G06F 9/54* (2006.01)

(56) References Cited

U.S. PATENT DOCUMENTS

| | | | |
|---|---|---|---|
| 2003/0081005 A1* | 5/2003 | Lin | G06F 3/04847 |
| | | | 715/781 |
| 2004/0042166 A1* | 3/2004 | Huang | G06F 3/023 |
| | | | 361/679.08 |
| 2005/0033777 A1* | 2/2005 | Moraes | G06F 16/27 |
| 2008/0141109 A1* | 6/2008 | Chen | G09G 5/003 |
| | | | 715/806 |
| 2008/0239149 A1* | 10/2008 | Lai | H04N 21/4312 |
| | | | 348/569 |
| 2009/0091538 A1* | 4/2009 | Lan | G06F 3/023 |
| | | | 345/172 |
| 2009/0278679 A1* | 11/2009 | Dailey | G06F 9/542 |
| | | | 340/500 |
| 2014/0160305 A1* | 6/2014 | Kiriyama | H04N 21/42653 |
| | | | 348/569 |
| 2016/0313835 A1* | 10/2016 | He | G09G 5/003 |
| 2017/0308261 A1* | 10/2017 | Lee | G09G 5/026 |

OTHER PUBLICATIONS

Combined Chinese Office Action and Search Report dated Mar. 16, 2022 in Patent Application No. 201911089144.8, 11 pages.
Lei Yong-feng, "KVM System Research Based on OSD Menu," Video Engineering, vol. 32, No. 1, 2008, pp. 50-52 (with English Abstract).
Office Action issued in corresponding European Patent Application No. 20 171 568.7 dated Jan. 2, 2023, 6 pages.

* cited by examiner

METHOD AND APPARATUS FOR IMPLEMENTING OSD

CROSS-REFERENCE TO RELATED APPLICATION

This application claims priority to Chinese Patent Application No. 2019110891448 filed on Nov. 8, 2019, the entire contents of which are incorporated herein by reference.

TECHNICAL FIELD

The present disclosure relates to the On-Screen Display (OSD) technology and in particular to a method and apparatus for implementing OSD.

BACKGROUND

OSD is generally a rectangular menu including information about various adjustment options of the display, which pops up on the screen after the Menu key is pressed. Various operation indexes, such as a color, mode, and geometry of the display, can be adjusted to the best usage state through the menu.

OSD implementation methods can include:

1. Superposition and synthesis of an external OSD generator and a video processor where the implementation principle of this method is that pictures of a TV set and OSD display contents are switched by a character generator and a display cache built in a Micro-Controller Unit (MCU) through Fast-Blank signals, so that OSD characters and other contents are superposed on the final display picture; and 2. Techniques where the OSD is supported in the video processor, and OSD information is directly superposed in the video cache. In this way, the video processing usually requires an external memory or a small amount of internal row caches, and also requires an OSD generator. The synthesis and control of OSD are directly completed in the video cache.

SUMMARY

The present disclosure provides a method and apparatus for implementing OSD. In accordance with a first aspect of the embodiments of the present disclosure, a method for implementing On-Screen Display (OSD) is provided that can be applied to a terminal device. The method can include the steps of receiving a Windows Management Instrumentation (WMI) event, the WMI event being triggered based on an OSD shortcut operation initiated by a user, and determining an OSD function corresponding to the WMI event according to a correspondence between WMI events and OSD functions, and acquiring popup window information corresponding to the OSD function. The method can further include generating an OSD function popup window according to the popup window information, and displaying the OSD function popup window.

Optionally, in the method, the popup window information corresponding to the OSD function can include one or more of the following information, including size information of a popup window, position information of the popup window, information of OSD function options, and transparency information of the popup window.

Additionally, in the method, the generating an OSD function popup window according to the popup window information can include generating the OSD function popup window in an animated manner according to popup window information corresponding to the OSD function, the OSD function popup window being a layer window.

In the method, the receiving a WMI event can include receiving the WMI event through inter-process communication of an operating system.

The method can further include acquiring the correspondence between the WMI events and the OSD functions in advance.

Further, in the method, the correspondence between the WMI events and the OSD functions further includes reserved extension bits, the extension bits are used for storing extended WMI events and OSD functions corresponding to the extended WMI events, and the extended WMI events are triggered based on extended OSD shortcut operations.

In accordance with a second aspect of the embodiments of the present disclosure, an apparatus for implementing On-Screen Display (OSD) is provided. The apparatus can include a processor, and a memory configured to store instructions executable for the processor. When executed by the processor, the instructions can cause the processor to receive a Windows Management Instrumentation (WMI) event, the WMI event being triggered based on an OSD shortcut operation initiated by a user, determine, from a correspondence between WMI events and OSD functions, an OSD function corresponding to the WMI event, and acquire popup window information corresponding to the OSD function, generate an OSD function popup window according to the popup window information, and display the OSD function popup window.

Optionally, in the apparatus, the popup window information corresponding to the OSD function can include one or more of the following information, including size information of a popup window, position information of the popup window, information of OSD function options, and transparency information of the popup window.

In the apparatus, the instructions can further cause the processor to generate the OSD function popup window in an animated manner according to popup window information corresponding to the OSD function, the OSD function popup window being a layer window.

Further, in the apparatus, the instructions further cause the processor to receive the WMI event through inter-process communication of an operating system.

The instructions further cause the processor to acquire the correspondence between the WMI events and the OSD functions in advance.

Additionally, in the apparatus, the correspondence between the WMI events and the OSD functions further includes reserved extension bits, the extension bits are used for storing extended WMI events and OSD functions corresponding to the extended WMI events, and the extended WMI events are triggered based on extended OSD shortcut operations.

In accordance with a third aspect of the embodiments of the present disclosure, a non-temporary computer-readable storage medium is provided, instructions in the storage medium, when executed by a processor of a mobile terminal, enabling the mobile terminal to execute a method for implementing On-Screen Display (OSD). The method can include receiving a Windows Management Instrumentation (WMI) event, the WMI event being triggered based on an OSD shortcut operation initiated by a user, determining an OSD function corresponding to the WMI event according to a correspondence between WMI events and OSD functions, and acquiring popup window information corresponding to the OSD function, generating an OSD function popup window according to the popup window information, and displaying the OSD function popup window.

The technical solutions provided in the embodiments of the present invention can have the following beneficial effects. For example, in the technical solutions of the present disclosure, attention is paid to WMI events corresponding to OSD shortcut operations and corresponding OSD functions triggered by the WMI events, instead of underlying hardware operations triggered by different OSD shortcut keys. In this way, even if OSD shortcut keys for terminal devices produced by different manufacturers are different and their hardware operations are different, the implementation of OSD functions can still be unified by triggering a same WMI event through the OSD shortcut keys.

It should be understood that the foregoing general description and the following detailed description are merely exemplary and explanatory, and are not intended to limit the present disclosure.

BRIEF DESCRIPTION OF THE DRAWINGS

The accompanying drawings to be described herein are incorporated into this specification and constitute a part of this specification. These accompanying drawings show the embodiments of the present invention, and are used, together with this specification, to explain the principle of the present invention.

DETAILED DESCRIPTION OF THE PRESENT INVENTION

Figure 1:
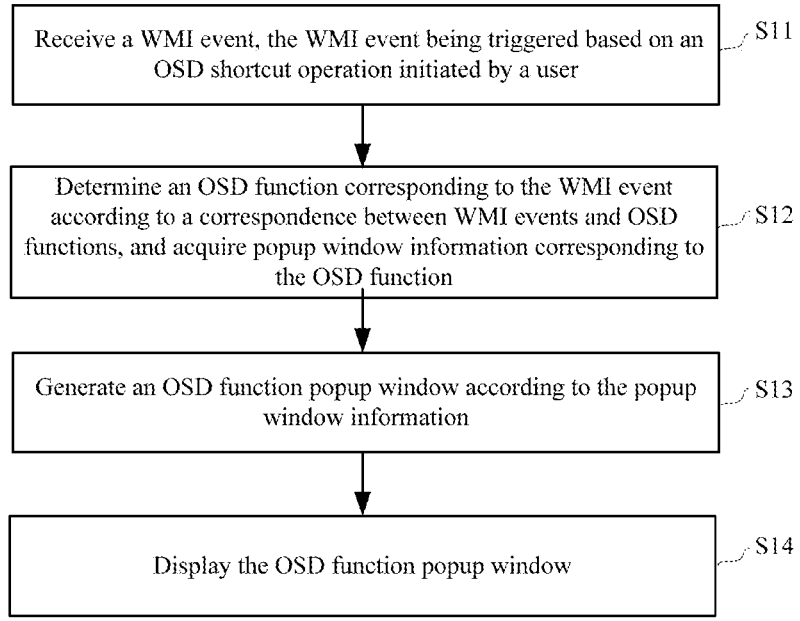
FIG. 1 is a schematic flowchart of a method for implementing OSD according to an exemplary embodiment.

Exemplary embodiments will be described in detail herein, and examples in the exemplary embodiments are shown in the accompanying drawings. When the accompanying drawings are involved in the following description, unless otherwise indicated, identical reference numerals in different accompanying drawings indicate identical or similar elements. The implementations described in the following exemplary embodiments do not represent all implementations consistent with the present invention. Instead, the implementations are merely examples of apparatuses and methods consistent with some aspects of the present invention as described in the appended claims.

This embodiment discloses a method for implementing OSD. With reference to FIG. 1, FIG. 1 shows a flowchart of a method for implementing OSD according to an exemplary embodiment. The method for implementing OSD may be applied in a terminal device. As shown in FIG. 1, the method for implementing OSD includes the following steps.

In the step S11, a Windows Management Instrumentation (WMI) event is received, the WMI event being triggered based on an OSD shortcut operation initiated by a user. The WMI event being triggered based on the OSD shortcut operation initiated by the user means that a corresponding WMI event is triggered when the user initiates an OSD shortcut operation. For example, when the user executes an input operation for the key CapsLock, a WMI event corresponding to this input operation is triggered. For another example, when the user executes an input operation for a combined shortcut key, a WMI event corresponding to this input operation is triggered, wherein the combined shortcut key may be, but not limited to, Fn+F6.

In the step S12, an OSD function corresponding to the WMI event is determined according to a correspondence between WMI events and OSD functions, and popup window information corresponding to the OSD function is acquired. The involved correspondence between WMI events and OSD functions may be configured by the system or set by the user. The correspondence between WMI events and OSD functions refers that different WMI events correspond to different OSD functions, respectively. That is, different WMI events may call different OSD functions, and function popup windows corresponding to the OSD functions are displayed to facilitate the user to adjust the OSD functions.

The OSD functions involved in the present disclosure include various functions related to the On-Screen Display (OSD). For example, the functions include adjustment of color, brightness, mode and geometry of the display, mode switching of the external projector, or the like. The WMI events include various Windows management instrumentation events. For example, the WMI events include Boot/WMI/HID_EVENT1, Boot/WMI/HID_EVENT2 or the like. In practical applications, the correspondence between WMI events and OSD functions may be set with reference to the correspondence between the OSD shortcut keys for triggering the WMI events and the OSD functions. For example, the OSD function corresponding to the combined shortcut key Fn+F7 is a mode switching function for the external projector. On this basis, the OSD function corresponding to the WMI event triggered by the combined shortcut key Fn+F7 may be set as the mode switching function for the external projector.

In the step S12, the popup window information corresponding to the OSD function may be acquired in various ways. For example, the popup window information may be acquired from the correspondence between WMI events and OSD functions. That is, in the correspondence between WMI events and OSD functions, different WMI events correspond to different OSD functions, respectively; and, in the correspondence, different OSD functions correspond to popup window information used for generating OSD function popup windows, respectively. For another example, the popup window information corresponding to the OSD function corresponding to the reported WMI event may be acquired from the popup window information corresponding to various OSD functions stored locally or in a third party.

In the step S13, an OSD function popup window is generated according to the popup window information.

In the step S14, the OSD function popup window is displayed. The involved OSD function popup window may provide operation options of one or more OSD functions for the user. The user may correspondingly adjust any one or more OSD functions by clicking or touching the options in the OSD function popup window. For example, the display color function popup window contains a display color value increase option and a display color value decrease option. In this way, the user clicking the display color value increase option is equivalent to the user performing an operation of increasing the current color value of the display. The user clicks the display color value decrease option is equivalent to the user performing an operation of decreasing the current color value of the display.

It can be known from the foregoing description that, in this embodiment, attention is paid to WMI events triggered by OSD shortcut keys and corresponding OSD functions triggered by the WMI events, instead of underlying hardware operations triggered by different OSD shortcut keys. In this way, even if OSD shortcut keys for terminal devices produced by different manufacturers are different and their hardware operations are different, the implementation of OSD functions can still be unified by triggering a same WMI event through the OSD shortcut keys, so that the implementation of OSD functions in the related art is simplified.

This embodiment further discloses a method for implementing OSD. In this method, the popup window information corresponding to the OSD function may include any one or more of the following information, including size information of the popup window, position information of the popup window, information of OSD function options, and transparency information of the popup window.

If the popup window information corresponding to the OSD function includes the size information of the popup window, the size of the OSD function popup window may be set according to the size information of the popup window.

If the popup window information corresponding to the OSD function includes the position information of the popup window, the coordinate position of the top left corner of the OSD function popup window on the display screen may be set according to the position information of the popup window.

If the popup window information corresponding to the OSD function includes the information of OSD function options, various operation options to be displayed in the OSD function popup window may be set according to the information of OSD function options. The operation options may include various options. For example, when the OSD function is the display color setup, the information of OSD function options corresponding to the OSD function may include a display color value increase option, a display color value decrease option or the like. When the OSD function is the display brightness setup, the information of OSD function options corresponding to the OSD function may include a display brightness value increase option, a display brightness value decrease option or the like.

If the OSD function popup window information includes the transparency information of the popup window, the transparency of the OSD function popup window may be set according to the transparency information of the popup window. For example, the OSD function popup window may be semi-transparent, non-transparent or the like.

Figure 2:
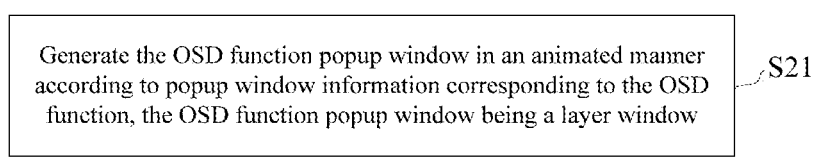
FIG. 2 shows a flowchart of a method for implementing OSD according to an exemplary embodiment.

This embodiment further discloses a method for implementing OSD. FIG. 2 shows a flowchart of a method for implementing OSD according to an exemplary embodiment. As shown in FIG. 2, the step S13 shown in FIG. 1 includes the following step S21, where the OSD function popup window is generated in an animated manner according to popup window information corresponding to the OSD function, the OSD function popup window being a layered window.

The way to generate the OSD function popup window in an animated manner can be that, when the user presses down a certain OSD shortcut key, the OSD function popup window corresponding to the OSD shortcut key may be dynamically displayed to the user. For example, the animation way may be fade-in fade-out, so that the OSD function popup window is dynamically displayed.

The layer window used in the OSD function popup window may be automatically combined with an inactive window under the Windows, realizing the mixed effect of different windows. Additionally, the transparency of the OSD function popup window may also be controlled by pasting pictures to the layer window. For example, the window transparency may be dynamically adjusted regularly through a timer, so that the OSD function popup window achieves the fade-out effect, the display effect of the OSD function popup window is optimized, and the user experience is improved.

Figure 3:
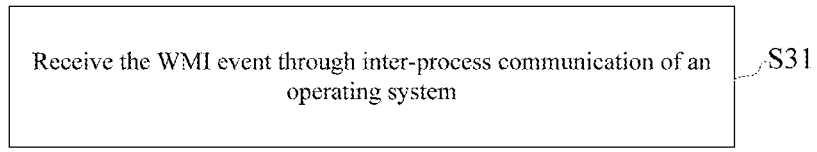
FIG. 3 shows a flowchart of a method for implementing OSD according to an exemplary embodiment.

This embodiment further discloses a method for implementing OSD. Specifically, FIG. 3 shows a flowchart of a method for implementing OSD according to an exemplary embodiment. As shown in FIG. 3, the step S11 shown in FIG. 1 can include step S31, where the WMI event is received through inter-process communication of an operating system.

Figure 4:
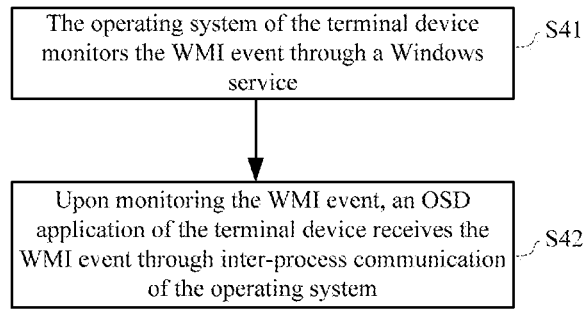
FIG. 4 is a schematic flowchart of receiving a WMI event through inter-process communication of an operating system in the method for implementing OSD according to an exemplary embodiment.

As shown in FIG. 4, the step S31 shown in FIG. 3 can include the following steps S41 where the operating system of the terminal device monitors the WMI event through a Windows Service, and step 42 where, upon monitoring the WMI event, the terminal device receives the WMI event through inter-process communication of the operating system.

For example, the process of receiving the WMI event may be realized by calling back the WMI event. That is, the call-back of the WMI event may be registered in advance by using an IWbemServices interface through a Component Object Model (COM) technology. There is a correspondence between WMI events and OSD shortcut operations. In this way, when a certain OSD shortcut operation is detected, the operating system determines a WMI event corresponding to this OSD shortcut operation. Subsequently, the determined WMI event is called back in a manner of receiving event asynchronously, and the WMI event is reported to an OSD application (OSD APP) through inter-process communication for subsequent operations.

Figure 5:
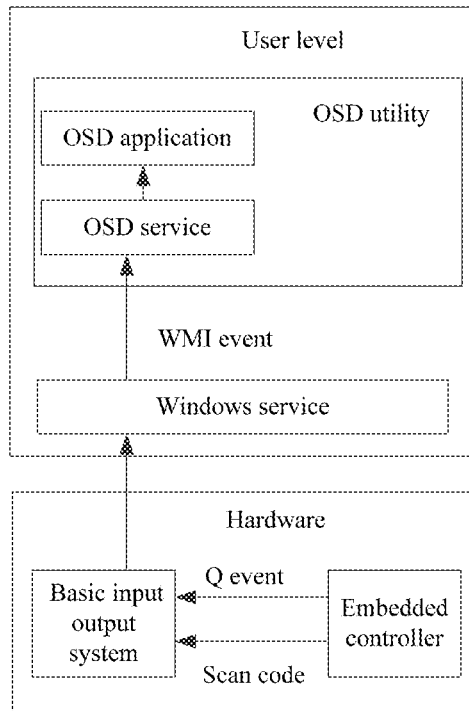
FIG. 5 is a schematic diagram of monitoring and reporting a WMI event, by a Windows service, to implement an OSD function according to an exemplary embodiment.

The principle of monitoring the WMI event by the operating system is shown in FIG. 5. When the user initiates an OSD shortcut operation, in the underlying hardware shown in FIG. 5, an Embedded Controller (EC) will detect the OSD shortcut operation, and the EC transmits a signal (e.g., a scan code or Q event signal) corresponding to the OSD shortcut operation to a Basic Input Output System (BIOS). The BIOS transmits the OSD shortcut operation detected by the hardware to a Windows Service in a User Level, and the Windows Service determines triggering a corresponding WMI event according to the received OSD shortcut operation and reports the triggered WMI event to an OSD Utility. An OSD Service in the OSD Utility notifies the WMI event to an OSD APP through Inter-Process Communication (IPC) so as to do a corresponding action, so that the separation of the User Interface (UT) from services is realized, and higher flexibility and robustness are realized.

Figure 6:
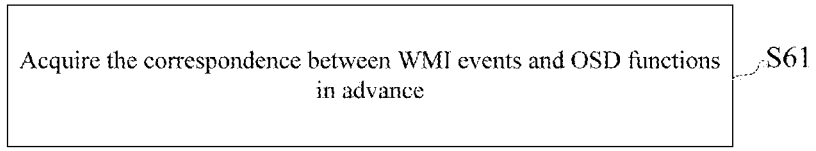
FIG. 6 shows a flowchart of a method for implementing OSD according to an exemplary embodiment.

This embodiment further discloses a method for implementing OSD. With reference to FIG. 6, FIG. 6 shows a flowchart of a method for implementing OSD according to an exemplary embodiment. As shown in FIG. 6, based on the steps S11 to S14, the method can further include step S61, where the correspondence between WMI events and OSD functions is acquired in advance.

The correspondence between WMI events and OSD functions may be acquired in advance in various ways. For example, the correspondence between WMI events and OSD functions may be locally acquired from the terminal device. For another example, the correspondence between WMI events and OSD functions may be acquired from a third party.

The correspondence between WMI events and OSD functions locally acquired from the terminal device may be initially set by the terminal device, or may be set and stored according to the user's operation. When the correspondence between various WMI events and various OSD functions is stored according to the user's operation, the WMI event triggered by the OSD shortcut operation may be set firstly, and the OSD function called by the OSD shortcut operation is then determined. In this way, the WMI event triggered by the OSD shortcut operation may correspond to the OSD function called by the OSD shortcut operation. For example, the WMI event triggered by the combined OSD shortcut key Fn+F7 is set as Boot/WMI/HID_EVENT2, and the OSD function to be called by the combined OSD shortcut key Fn+F7 is the mode switching function for the external projector. Therefore, in the correspondence between WMI events and OSD functions, the OSD function corresponding to the WMI event Boot/WMI/HID_EVENT2 is stored as the mode switching function for the external projector.

This embodiment further discloses a method for implementing OSD. In this method, the correspondence between WMI events and OSD functions may further include reserved extension bits, the extension bits are used for storing extended WMI events and OSD functions corresponding to the extended WMI events, and the extended WMI events are triggered based on extended OSD shortcut operations.

In this embodiment, considering that the OSD function may be extended, after a new OSD function is developed, the OSD shortcut key of the new OSD function can trigger an extended WMI event, the extended WMI event is stored in the extension bits of the correspondence, and the OSD function corresponding to the extended WMI event is stored in the extension bits.

In this embodiment, the WMI event is triggered by the OSD shortcut operation initiated by the user, that is, there is a correspondence between WMI events and OSD shortcut keys. WMI events correspondingly triggered by different OSD shortcut keys may be configured in advance.

In this embodiment, the correspondence between various OSD shortcut keys and the WMI events triggered by the OSD shortcut keys may be stored in a manner with reference to the following table 1.

TABLE 1

Correspondence between various OSD shortcut keys and the WMI events triggered by the OSD shortcut keys

| Globally unique identifier | WMI event | OSD Shortcut key |
| --- | --- | --- |
| 2dbe0be8-6258-43e5-b0be-1b8c25ba62b7 | Boot/WMI/HID_EVENT1 | Fn + F6 |
| 2ae67899-7348-429c-90e2-4ca7d1a5b575 | Boot/WMI/HID_EVENT2 | Fn + F7 |
| 89a34d62-79e4-4776-b820-b4a6b7457378 | Boot/WMI/HID_EVENT3 | Fn + F8 |
| F1244fb8-d492-4abf-bb4c-90d1b333fcb8 | Boot/WMI/HID_EVENT4 | Fn + F9 |
| f4692311-9afb-4511-b696-65be7b685842 | Boot/WMI/HID_EVENT5_0 | Fn + F10 |
| 0c348233-5929-4b23-9747-7f816ae413f8 | Boot/WMI/HID_EVENT5_1 | |
| ac1e3a3d-85e8-42d0-a929-70cb11a756fd | Boot/WMI/HID_EVENT5_2 | |
| f23def99-fa41-4a05-8e15-5a0ce4bd835e | Boot/WMI/HID_EVENT5_3 | |
| 530b012d-69b0-4c01-8d8e-8a97e4c4e7a7 | Boot/WMI/HID_EVENT5_4 | |
| 16f71379-f1f9-4d25-b040-aa9ca89ffd5d | Boot/WMI/HID_EVENT5_5 | |
| 3a31f432-5b57-478e-9238-8527985ef68b | Boot/WMI/HID_EVENT5_6 | |
| 85d37db5-3beb-48f2-98e1-758161941bca | Boot/WMI/HID_EVENT5_7 | |
| 41e009a2-119b-4988-a9e1-1f7c5c8ddc90 | Boot/WMI/HID_EVENT5_8 | |
| 54671c7a-015f-4d9c-9c70-89ee922a6dfb | Boot/WMI/HID_EVENT5_9 | |
| ca54bfba-e042-4113-8b26-f551ba005966 | Boot/WMI/HID_EVENT5_10 | Fn + F10 |
| f3898fef-1de4-4bdc-83fa-c22444267f59 | Boot/WMI/HID_EVENT6 | Fn + Space |
| 238eff77-0e63-47f8-9f2e-2b8ce42964a | Boot/WMI/HID_EVENT7 | Fn + Space |
| 9f6af08e-573b-4f94-9033-a68c672d2381 | Boot/WMI/HID_EVENT8 | Fn + Esc |
| 3223ec2d-cb66-48c3-bdcd-56c413f57bb9 | Boot/WMI/HID_EVENT9 | Fn + Esc |
| 184cc2f4-7673-4aae-b3e2-c4390799852c | Boot/WMI/HID_EVENT10 | DoubleFn |
| cdc56ace-b6f4-47c1-b756-f35661d99440 | Boot/WMI/HID_EVENT11 | Capslock |
| 2ac38674-0bb2-4e39-a21e-2facab1623ed | Boot/WMI/HID_EXT_EVENT1 | |
| eb2464d2-d6f5-483f-bc9c-685e89f536f6 | Boot/WMI/HID_EXT_EVENT2 | |
| 934836eb-37c6-4aad-bced-155b41ef0894 | Boot/WMI/HID_EXT_EVENT3 | |
| e379ab63-5ddb-4f86-a482-7a6332ee65f7 | Boot/WMI/HID_EXT_EVENT4 | |
| d69d08bc-d14c-43ff-a06b-fa703f7723f7 | Boot/WMI/HID_EXT_EVENT5 | |
| 984082b0-2c33-406f-8d59-2b1c15ea7e21 | Boot/WMI/HID_EXT_EVENT6 | |
| bed436a6-fbf5-4018-9211-1982255841c6 | Boot/WMI/HID_EXT_EVENT7 | |
| 7cef85fe-8dc3-4646-943c-d71015f40945 | Boot/WMI/HID_EXT_EVENT8 | |

The first left column in the table 1 shows the Globally Unique Identifier (GUID) of each WMI event. The GUID can be used for indicating the unique identifier corresponding to the WMI event. The second left column in the table 1 shows each WMI event. The third left column in the table 1 shows the OSD shortcut key corresponding to the WMI event, i.e., the OSD shortcut key that can trigger the WMI event. In the table 1, the blanks in the third column can be used as extension bits, indicating that there is currently no OSD shortcut key corresponding to the WMI event. When the WMI event corresponding to certain extension bits is configured to implement an extended OSD function, the OSD shortcut key corresponding to the extended OSD function is added to the extension bits. Moreover, it can be known from the table 1 that the same OSD shortcut key may correspond to different WMI events. Considering the terminal devices produced by different manufacturers, the OSD functions corresponding to the OSD shortcut operation may be different. Therefore, in the table 1, OSD shortcut keys of terminal devices produced by different manufacturers may correspond to different WMI events, and one correspondence will be selected as required. For example, according to the specific function of the OSD shortcut key Fn+Esc of different terminal devices produced by different manufacturers, one WMI event can be selected, from WMI event of Boot/WMI/HID_EVENT8 or WMI event of Boot/WMI/HID_EVENT9, to correspond to Fn+Esc.

Figure 7:
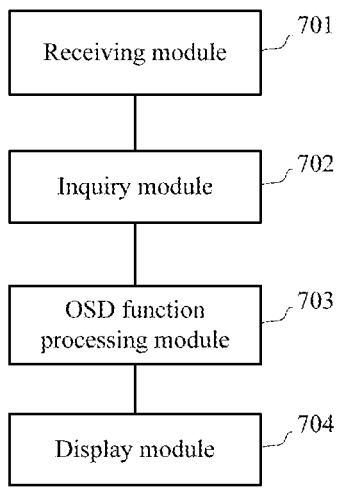
FIG. 7 is a structural block diagram of an apparatus for implementing OSD according to an exemplary embodiment.

FIG. 7 shows a structural block diagram of an apparatus for implementing On-Screen Display (OSD) according to an exemplary embodiment. With reference to FIG. 7, the apparatus can include a receiving module 701, an inquiry module 702, an OSD function processing module 703, and a display module 704.

The receiving module 701 is configured to receive a WMI event, wherein the WMI event may be triggered based on an OSD shortcut operation initiated by a user.

The inquiry module 702 is configured to determine, from a correspondence between WMI events and OSD functions, an OSD function corresponding to the WMI event, and acquire popup window information corresponding to the OSD function. For example, it is possible that, upon receiving the WMI event, the receiving module determines, from the correspondence between WMI events and OSD functions, an OSD function corresponding to the received WMI event, and acquires popup window information corresponding to the OSD function.

The OSD function processing module 703 is configured to generate an OSD function popup window according to the popup window information.

The display module 704 is configured to display the OSD function popup window.

This embodiment further discloses an apparatus for implementing OSD. The popup window information corresponding to the OSD function acquired by the inquiry module 702 include one or more of the following information, including size information of a popup window, position information of the popup window, information of OSD function options, and transparency information of the popup window.

For example, if the popup window information corresponding to the OSD function includes the size information of the popup window, the OSD function processing module may set the size of the OSD function popup window according to the size information of the popup window.

If the popup window information corresponding to the OSD function includes the position information of the popup window, the coordinate position of the top left corner of the OSD function popup window on the display screen may be set according to the position information of the popup window.

If the popup window information corresponding to the OSD function includes the information of OSD function options, various operation options to be displayed in the OSD function popup window may be set according to the information of OSD function options.

If the OSD function popup window information includes the transparency information of the popup window, the transparency of the OSD function popup window may be set according to the transparency information of the popup window.

This embodiment further discloses an apparatus for implementing OSD. The generating an OSD function popup window according to the popup window information includes:

The OSD function processing module 703 generates the OSD function popup window in an animated manner according to popup window information corresponding to the OSD function, the OSD function popup window being a layered window.

The way to generate the OSD function popup window in an animated manner may be as follows: when the user presses down a certain OSD shortcut key, the OSD function popup window corresponding to the OSD shortcut key may be dynamically displayed to the user. For example, the animation way may be fade-in fade-out, so that the OSD function popup window is dynamically displayed.

This embodiment further discloses an apparatus for implementing OSD. In the apparatus, the receiving a WMI event can include the receiving module 701 receiving the WMI event through inter-process communication of an operating system.

Figure 8:
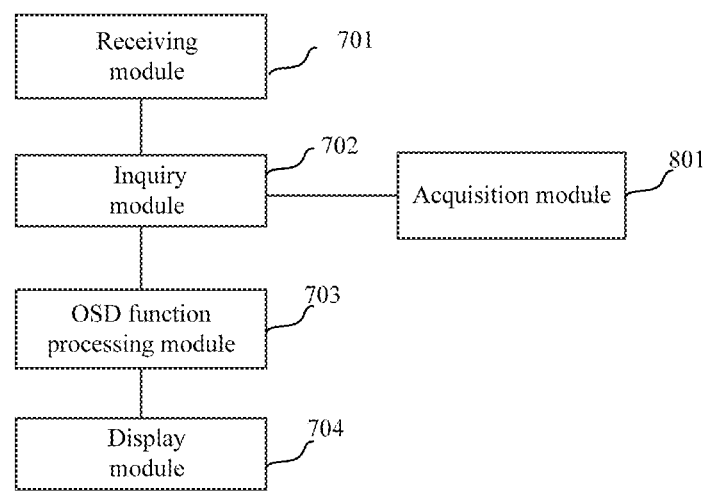
FIG. 8 is a structural block diagram of an apparatus for implementing OSD according to an exemplary embodiment.

This embodiment further discloses an apparatus for implementing OSD. As shown in FIG. 8, based on the receiving module 701, the inquiry module 702, the OSD function processing module 703 and the display module 704, the apparatus further includes an acquisition module 801.

The acquisition module 801 is configured to acquire the correspondence between the WMI events and the OSD functions in advance.

The correspondence between WMI events and OSD functions acquired by the acquisition module 801 may further contain the correspondence between various OSD shortcut keys and WMI events.

This embodiment further discloses an apparatus for implementing OSD. The correspondence between WMI events and OSD functions involved in the apparatus further contains reserved extension bits. The extension bits may store extended WMI events and OSD functions corresponding to the extended WMI events. The extended WMI events may be triggered based on the extended OSD shortcut operations. In this way, when an OSD function is extended, the extended OSD function may also be called by triggering the corresponding WMI event through an OSD shortcut operation.

This embodiment further discloses an apparatus for implementing OSD. In this apparatus, the receiving module 701 may be provided in an OSD service, and the function of the receiving module 701 is implemented by the OSD service. That is, the OSD service can receive the WMI event triggered by the OSD shortcut operation and reported by the Windows service. The inquiry module 702, the OSD function processing module 703 and the display module 704 may be integrated in an OSD APP, and the functions of the inquiry module 702, the OSD function processing module 703 and the display module 704 are implemented by the OSD APP.

For the apparatuses in the above embodiments, the specific operations executed by each unit module have been described in detail in the embodiments of the methods, and will not be repeated here.

Figure 9:
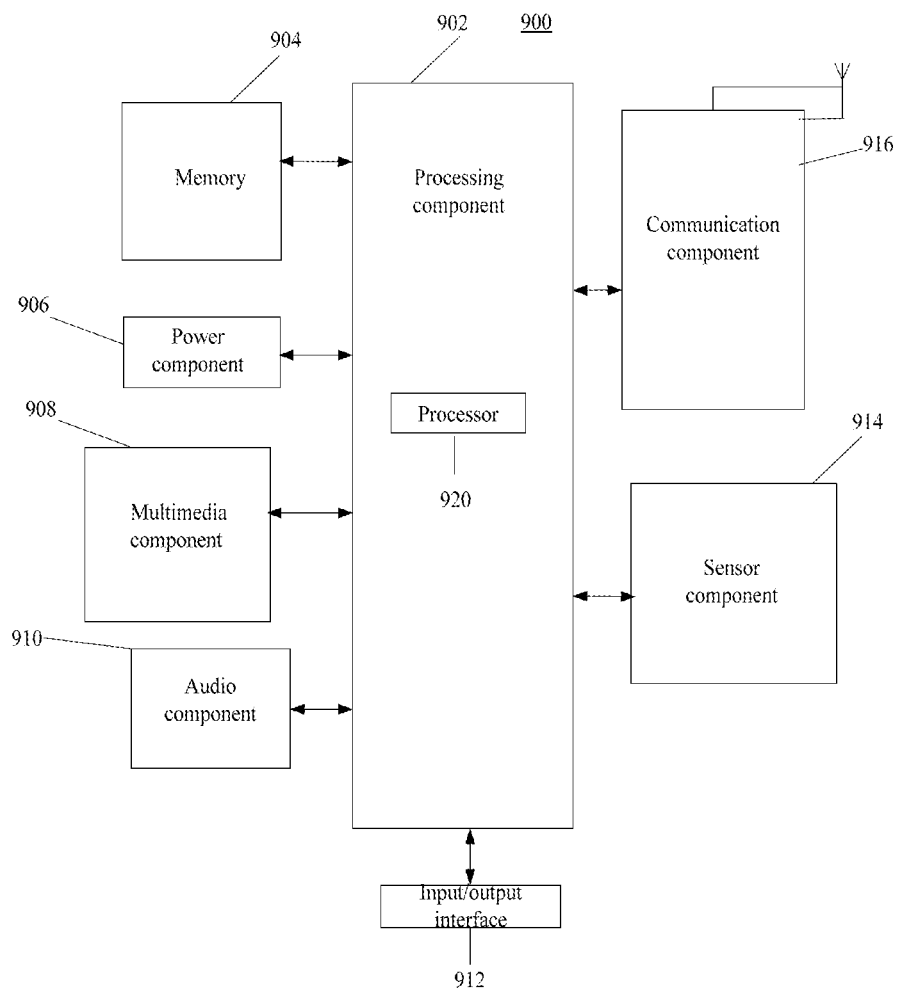
FIG. 9 is a structural block diagram of an apparatus for implementing OSD according to an exemplary embodiment.

FIG. 9 is a block diagram of an apparatus 900 for implementing OSD according to an exemplary embodiment. For example, the apparatus 900 may be a mobile phone, a computer, a digital broadcasting terminal, a messaging device, a game console, a tablet device, a medical device, a fitness device, a personal digital assistant, and the like.

As shown in FIG. 9, the apparatus 900 may include one or more of the following components: a processing component 902, a memory 904, a power component 906, a multimedia component 908, an audio component 910, an input/output (I/O) interface 912, a sensor component 914, and a communication component 916.

The processing component 902 generally controls the overall operation of the apparatus 900, such as operations associated with display, telephone call, data communication, camera operations and recording operations. The processing component 902 may include one or more processors 920 to execute instructions to complete all or some of the steps in the methods described above. Additionally, the processing component 902 may include one or more modules to facilitate interaction between the processing component 902 and other components. For example, the processing component 902 may include a multimedia module to facilitate interaction between the multimedia component 908 and the processing component 902.

The memory 904 is configured to store various types of data to support the operation of the apparatus 900. Examples of the data include instructions for any application or method operating on the apparatus 900, contact data, phonebook data, messages, pictures, video or the like. The memory 904 may be implemented by any type of volatile or non-volatile storage devices or a combination thereof, for example, a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disk.

The power component 906 supplies power to various components of the apparatus 900. The power component 906 may include a power management system, one or more power supplies, and other components associated with the generation, management and distribution of power for the apparatus 900.

The multimedia component 908 includes a screen to provide an output interface between the apparatus 900 and a user. In some embodiments, the screen may include a Liquid Crystal Display (LCD) and a Touch Panel (TP). If the screen includes a TP, the screen may be implemented as a touch screen to receive input signals from the user. The touch panel includes one or more touch sensors to sense touching, sliding and gestures on the touch panel. The touch sensor may sense the boundary of a touch or slide action, and also detect the duration and pressure related to the touch or slide operation. In some embodiments, the multimedia component 908 includes a front camera and/or a rear camera. When the apparatus 900 is in an operation mode such as a shooting mode or a video mode, the front camera and/or the rear camera may receive external multimedia data. Each of the front camera and the rear camera may be a fixed optical lens system or have a focal length and an optical zooming capability.

The audio component 910 is configured to output and/or input audio signals. For example, the audio component 910 includes a microphone (MIC). When the apparatus 900 is in an operation mode such as a call mode, a recording mode or a voice recognition mode, the microphone is configured to receive external audio signals. The received audio signals may be further stored in the memory 804 or transmitted via the communication component 916. In some embodiments, the audio component 910 further includes a loudspeaker configured to output the audio signals.

The I/O interface 912 provides an interface between the processing component 902 and a peripheral interface module. The peripheral interface module may be a keyboard, a click wheel, buttons or the like. These buttons may include, but not limited to: a Home button, a Volume button, a Start button, and a Lock button.

The sensor component 914 includes one or more sensors configured to provide state evaluation of various aspects of the apparatus 900. For example, the sensor component 914 may detect the on/off state of the apparatus 900 and the relative position of a component. For example, if the component is a display and a keypad of the apparatus 900, the sensor component 914 may also detect the position change of the apparatus 900 or one component of the apparatus 900, the presence or absence of the user's contact with the apparatus 900, the orientation or acceleration/deceleration of the apparatus 900 and the temperature change of the apparatus 900. The sensor component 914 may include a proximity sensor configured to detect the presence of nearby objects without any physical contact. The sensor component 914 may further include an optical sensor (e.g., a CMOS or CCD image sensor) for use in imaging applications. In some embodiments, the sensor component 914 may further include an acceleration sensor, a gyroscope sensor, a magnetic sensor, a pressure sensor or a temperature sensor.

The communication component 916 is configured to facilitate the wired or wireless communication between the apparatus 900 and other devices. The apparatus 900 may access to a wireless network based on communication standards, for example, WiFi, 2G, 3G or a combination thereof. In an exemplary embodiment, the communication component 916 receives a broadcast signal or broadcast related information from an external broadcast management system via a broadcast channel. In an exemplary embodiment, the communication component 916 further includes a Near-Field Communication (NFC) module to facilitate short-range communication. For example, the NFC module may be implemented based on a Radio Frequency Identification (RFID) technology, an Infrared Data Association (IrDA) technology, an Ultra Wide Band (UWB) technology, a Bluetooth (BT) technology and other technologies.

In an exemplary embodiment, the apparatus 900 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors or other electronic elements to execute the methods described above.

In an exemplary embodiment, a non-temporary computer-readable storage medium including instructions is further provided, for example, the memory 904 including instructions. The instructions may be executed by the processor 920 of the apparatus 900 to complete the methods described above. For example, the non-temporary computer-readable storage medium may be a ROM, a Random Access Memory (RAM), a CD-ROM, a magnetic tape, a floppy disk, an optical data storage device, and the like.

A non-temporary computer-readable storage medium is provided. Instructions in the storage medium, when executed by a processor of a mobile terminal, enable the mobile terminal to execute a method for implementing OSD. The method can include the steps of receiving a Windows Management Instrumentation (WMI) event, the WMI event being triggered based on an OSD shortcut operation initiated by a user, determining an OSD function corresponding to the WMI event according to a correspondence between WMI events and OSD functions, and acquiring popup window information corresponding to the OSD function, generating an OSD function popup window according to the popup window information, and displaying the OSD function popup window.

An apparatus for implementing OSD according to an exemplary embodiment of the present disclosure can include a processor, and a memory configured to store instructions executable by the processor.

The processor can be configured to execute the following instructions of receiving a Windows Management Instrumentation (WMI) event, the WMI event being triggered by an OSD shortcut operation initiated by a user, determining an OSD function corresponding to the WMI event according to a correspondence between WMI events and OSD functions, and acquiring popup window information corresponding to the OSD function, generating an OSD function popup window according to the popup window information, and displaying the OSD function popup window.

For the apparatuses in the above embodiments, the way in which the processor is configured to execute specific operations have been described in detail in the embodiments of the methods for implementing OSD, and will not be repeated here.

In an exemplary embodiment, a non-temporary computer-readable storage medium including instructions is further provided. The instructions may be executed by the processor of the apparatus for implementing OSD to complete the method for implementing OSD. For example, the non-temporary computer-readable storage medium may be a ROM, a Random Access Memory (RAM), a CD-ROM, a magnetic tape, a floppy disk, an optical data storage device, and the like.

For the apparatuses in the above embodiments, the specific operations of the instructions in the non-temporary computer-readable storage medium have been described in detail in the embodiments of the methods for implementing OSD, and will not be repeated here.

Other embodiments of the present invention will be readily apparent to those skilled in the art upon considering this specification and the practices of inventions disclosed herein. The present application is intended to cover any variations, uses or adaptations of the present invention, and these variations, uses or adaptations follow the general principle of the present invention and include the common knowledge or conventional technical means in this technical art that are not disclosed herein. This specification and the embodiments are merely exemplary, and the scope and spirit of the present invention are defined by the following claims.

It should be understood that the present invention is not limited to the precise structures that have been described above and shown in the accompanying drawings, and various modifications and alterations may be made without departing from the scope of the present invention. The scope of the present invention is merely limited by the appended claims.

The invention claimed is:

1. A method for implementing On-Screen Display (OSD) on a terminal device, the method comprising steps of:
receiving a Windows Management Instrumentation (WMI) event, the WMI event being triggered based on an OSD shortcut operation initiated by a user;
determining an OSD function corresponding to the WMI event according to a correspondence between WMI events and OSD functions, and acquiring popup window information corresponding to the OSD function;
generating an OSD function popup window according to the popup window information; and
displaying the OSD function popup window;
wherein the correspondence between WMI events and OSD functions refers that different WMI events correspond to different OSD functions, respectively.

2. The method according to claim 1, wherein the popup window information corresponding to the OSD function comprises one or more types of information including a size of the popup window, a position of the popup window, OSD function options, and a transparency of the popup window.

3. The method according to claim 1, wherein the generating an OSD function popup window according to the popup window information further comprises:
generating the OSD function popup window in an animated manner according to popup window information corresponding to the OSD function, the OSD function popup window being a layered window.

4. The method according to claim 2, wherein the generating an OSD function popup window according to the popup window information further comprises:
generating the OSD function popup window in an animated manner according to popup window information corresponding to the OSD function, the OSD function popup window being a layered window.

5. The method according to claim 1, wherein the receiving a WMI event further comprises receiving the WMI event through an inter-process communication of an operating system.

6. The method according to claim 1, further comprising:
acquiring the correspondence between the WMI events and the OSD functions in advance.

7. The method according to claim 1, after a new OSD function is developed, an OSD shortcut key of the new OSD function can trier an extend WMI event, and the correspondence between the WMI events and the OSD functions further comprises reserved extension bits that are used for storing extended WMI events and OSD functions corresponding to the extended WMI events.

8. An apparatus for implementing On-Screen Display (OSD), comprising:
a processor; and
a memory that is configured to store instructions executable for the processor that, when executed by the processor, causes the processor to:
receive a Windows Management Instrumentation (WMI) event, the WMI event being triggered based on an OSD shortcut operation initiated by a user;
determine, from a correspondence between WMI events and OSD functions, an OSD function corresponding to the WMI event, and acquire popup window information corresponding to the OSD function;
generate an OSD function popup window according to the popup window information;
display the OSD function popup window;
wherein the correspondence between WMI events and OSD functions refers that different WMI events correspond to different OSD functions, respectively.

9. The implementation apparatus according to claim 8, wherein the popup window information corresponding to the OSD function comprises one or more types of information including a size of the popup window, a position of the popup window, OSD function options, and a transparency of the popup window.

10. The implementation apparatus according to claim 8, wherein the instructions further cause the processor to:
generate the OSD function popup window in an animated manner according to popup window information corresponding to the OSD function, the OSD function popup window being a layered window.

11. The implementation apparatus according to claim 9, wherein the instructions further cause the processor to:
generate the OSD function popup window in an animated manner according to popup window information corresponding to the OSD function, the OSD function popup window being a layered window.

12. The implementation apparatus according to claim 8, wherein the instructions further cause the processor to receive the WMI event through an inter-process communication of an operating system.

13. The implementation apparatus according to claim 8, wherein the instructions further cause the processor to acquire the correspondence between the WMI events and the OSD functions in advance.

14. The implementation apparatus according to claim 8, after a new OSD function is developed, an OSD shortcut key of the new OSD function can trigger an extend WMI event, and the correspondence between the WMI events and the OSD functions further includes reserved extension bits that are used for storing extended WMI events and OSD functions corresponding to the extended WMI events.

15. A non-temporary computer-readable storage medium storing instructions that, when executed by a processor of a mobile terminal, enables the mobile terminal to execute a method for implementing On-Screen Display (OSD), the method comprising operations of:
receiving a Windows Management Instrumentation (WMI) event, the WMI event being triggered based on an OSD shortcut operation initiated by a user;
determining an OSD function corresponding to the WMI event according to a correspondence between WMI events and OSD functions, and acquiring popup window information corresponding to the OSD function;
generating an OSD function popup window according to the popup window information; and
displaying the OSD function popup window;
wherein the correspondence between WMI events and OSD functions refers that different WMI events correspond to different OSD functions, respectively.

* * * * *